United States Patent
Wu (10) Patent No.: US 10,043,071 B1
(45) Date of Patent: Aug. 7, 2018

(54) AUTOMATED DOCUMENT CLASSIFICATION

(71) Applicant: MorphoTrust USA, LLC, Billerica, MA (US)

(72) Inventor: Yecheng Wu, Lexington, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 15/223,283

(22) Filed: Jul. 29, 2016

Related U.S. Application Data (60) Provisional application No. 62/198,922, filed on Jul. 30, 2015.

(51) Int. Cl.
| | |
|---|---|
| *G06K 9/00* | (2006.01) |
| *G06T 7/60* | (2017.01) |
| *G06K 9/52* | (2006.01) |
| *G06K 9/66* | (2006.01) |
| *G06K 9/46* | (2006.01) |

(52) U.S. Cl.
CPC ..... *G06K 9/00456* (2013.01); *G06K 9/00483* (2013.01); *G06K 9/4642* (2013.01); *G06K 9/52* (2013.01); *G06K 9/66* (2013.01); *G06T 7/60* (2013.01); *G06T 2207/20021* (2013.01)

(58) Field of Classification Search
CPC ........... G06K 9/00442; G06K 9/00288; G06K 9/036; G06K 9/4642; G06K 9/6212; G06K 9/627; G06T 7/0002; G07D 7/2083
See application file for complete search history.

(56) References Cited

U.S. PATENT DOCUMENTS

| | | | |
|---|---|---|---|
| 7,272,259 B2 * | 9/2007 | Houle | G06K 9/00154 345/179 |
| 9,836,643 B2 * | 12/2017 | Saripalle | G06K 9/00288 |
| 2013/0223683 A1 * | 8/2013 | Jiang | G06K 9/4638 382/103 |
| 2014/0180981 A1 * | 6/2014 | Dolev | G06K 9/00442 706/12 |
| 2015/0341370 A1 * | 11/2015 | Khan | H04L 63/20 726/30 |
| 2016/0012658 A1 * | 1/2016 | Lohweg | G07D 7/2016 382/135 |
| 2016/0092735 A1 * | 3/2016 | Govil | G06K 9/605 382/103 |
| 2016/0148076 A1 * | 5/2016 | Kozitsky | G06K 9/627 382/159 |
| 2017/0132866 A1 * | 5/2017 | Kuklinski | G07D 7/2083 |

OTHER PUBLICATIONS

Tan, Xiaoyang, and Bill Triggs. "Enhanced local texture feature sets for face recognition under difficult lighting conditions." IEEE transactions on image processing 19.6 (2010): 1635-1650.*

* cited by examiner

*Primary Examiner* — Li Liu
(74) *Attorney, Agent, or Firm* — Fish & Richardson P.C.

(57) ABSTRACT

First data corresponding to a first document is obtained. A first feature vector is generated for the first data. The first feature vector is provided as an input to a classifier. The classifier is trained to characterize the first document as having one of a first characteristic or a second characteristic based on the first feature vector.

25 Claims, 6 Drawing Sheets

AUTOMATED DOCUMENT CLASSIFICATION

CROSS REFERENCE TO RELATED APPLICATIONS

This application claims the benefit of priority under 35 U.S.C. § 119(e) of U.S. Provisional Application No. 62/198,922, filed on Jul. 30, 2015, and entitled "Automated Document Classification," which is incorporated herein by reference in its entirety.

TECHNICAL FIELD

The following disclosure relates generally to automated classification of documents.

BACKGROUND

Documents can serve various useful purposes. For example, driver's licenses, passports, or other suitable identification documents can be used to prove a person's identity; a degree certificate can be used to prove a person's professional qualifications; and a bank check can be used to withdraw funds. Sometimes such documents can be forged.

SUMMARY

The following disclosure describes techniques for automatically classifying documents as either authentic or forged, using a computing device with an optical input (e.g., a camera). The techniques use trained classifiers, such as neural network or support vector machine (SVM) based-classifiers, which are trained by a large number of image pixel-level patterns generated from documents to detect forged or counterfeit documents. The image pixel patterns may include local binary patterns (LBP), local ternary patterns (LTP), image texture patterns or any other suitable image pattern combinations and variations.

In a general aspect, first data corresponding to a first document is obtained. A first feature vector is generated for the first data. The first feature vector is provided as an input to a classifier. The classifier is trained to characterize the first document as having one of a first characteristic or a second characteristic based on the first feature vector.

Particular implementations may include one or more of the following features. The first characteristic may correspond to identifying a document as real, and the second characteristic may correspond to identifying a document as fake.

Feature vectors associated with a plurality of documents may be iteratively provided as inputs to the classifier for training the classifier. Each document in the plurality may have one of the first characteristic or the second characteristic.

Second data corresponding to a second document may be obtained. A second feature vector may be generated for the second data. The second feature vector may be provided as an input to the classifier. The classifier may estimate, based on the second feature vector, whether the second document corresponds to the first characteristic or the second characteristic. The classifier may output a measure of the estimate whether the second document corresponds to the first characteristic or the second characteristic.

Estimating whether the second document corresponds to the first characteristic or the second characteristic may comprise categorizing, by the classifier and based on the training, a plurality of feature vectors into one of a first group corresponding to the first characteristic or a second group corresponding to the second characteristic. The classifier may determine whether the second feature vector corresponds to feature vectors included in the first group or the second group. The classifier may estimate that the second document corresponds to the first characteristic conditioned on determining that the second feature vector corresponds to feature vectors included in the first group. The classifier may estimate that the second document corresponds to the second characteristic conditioned on determining that the second feature vector corresponds to feature vectors included in the second group.

Obtaining the first data may include obtaining an image of the first document. Obtaining the second data may include obtaining an image of the second document.

Generating the first feature vector may comprise generating a pixel-level pattern of the image the first document. The first data may be divided into cells, each cell including pixels. Each pixel in a cell may be compared to a group of neighboring pixels. For each neighboring pixel in the group, a first value may be recorded based on determining that a value of the pixel is greater than a value of the neighboring pixel, while a second value may be recorded based on determining that the value of the pixel is smaller than the value of the neighboring pixel. A number for the pixel may be computed that is composed of one or more of first values and second values determined for the group of neighboring pixels. A histogram may be generated for each cell corresponding to the numbers for the pixels included in the cell. The histograms for all the cells corresponding to the first data may be aggregated. The first feature vector for the first data may be generated based on the aggregated histograms.

The number computed for a pixel from the first value and the second value may correspond to a binary value. The number for each pixel may include a binary number with a number of digits that corresponds to a computed number from the neighboring pixels in the group of neighboring pixels.

Generating the histogram for each cell may comprise normalizing the histogram. Generating the first feature vector or the second feature vector may comprises generating one or more of local ternary patterns, image texture patterns, or image pattern combinations and variations.

The classifier may include one of a neural network classifier or a support vector machine (SVM) classifier. The feature vector may include a collection of numbers derived from the document. The document may include a physical object with information printed, written, etched or pressed by suitable fabricating means. The document may be a digital document with information and layout rendered on a display device. The display device may be a display monitor, television (TV), phone, or some other suitable display device.

Implementations of the above techniques include methods, systems, computer program products and computer-readable media. One such computer program product is suitably embodied in a non-transitory machine-readable medium that stores instructions executable by one or more processors. The instructions are configured to cause the one or more processors to perform the above-described actions. One such computer-readable medium stores instructions that, when executed by a processor, are configured to cause the processor to perform one or more of the above described actions. One such system includes one or more processors and a storage device storing instructions that, when executed by the one or more processors, cause the one or more processors to perform the above-described actions.

The techniques disclosed herein provide easy-to-deploy automated solutions to identify forged documents and authenticate valid documents. The techniques also may be used to identify other suitable document characteristics that the classifiers are trained to detect. The techniques are computationally efficient and be used on a standard computing device with an optical input, such as a mobile phone with a camera or a smartphone, or other suitable devices.

The details of one or more disclosed implementations are set forth in the accompanying drawings and the description below. Other features, aspects, and advantages will become apparent from the description, the drawings and the claims.

DETAILED DESCRIPTION

Documents that serve various useful purposes, such as driver's licenses, passports, or other identification documents, degree certificates, bank checks, among others, can be forged. It may be useful to determine whether a document that is presented for an official purpose, such as a driver's license or a passport that is presented to identify the bearer of the document, is real or counterfeit, so as to determine the validity of authorization, e.g., for gaining admission to restricted areas, authorization to conduct business transactions, etc.

Examination of documents and detection of forged documents has often been done manually. Manual detection of document forgery or counterfeits requires training technicians, which may be time consuming and expensive. It may be useful to develop computationally efficient and easy-to-deploy techniques to automate the detection of forged documents and counterfeits. Such techniques can be implemented on portable devices, such as a mobile phone with a camera (e.g., a smartphone). Consequently, a user of a portable device can use the automated techniques to detect whether a document presented to the user is real or fake. The user does not need to have any specialized training to perform the detection.

The following sections describe techniques to automate the classification of documents as real or forged, and thereby allow detection of forged documents. The techniques identify forged documents and counterfeits using classifiers trained by a large number of image pixel-level patterns generated from the documents. In some implementations, the techniques may be used to classify documents, or images of other objects, based on different suitable characteristics.

Figures 1A, 1B, 1C:
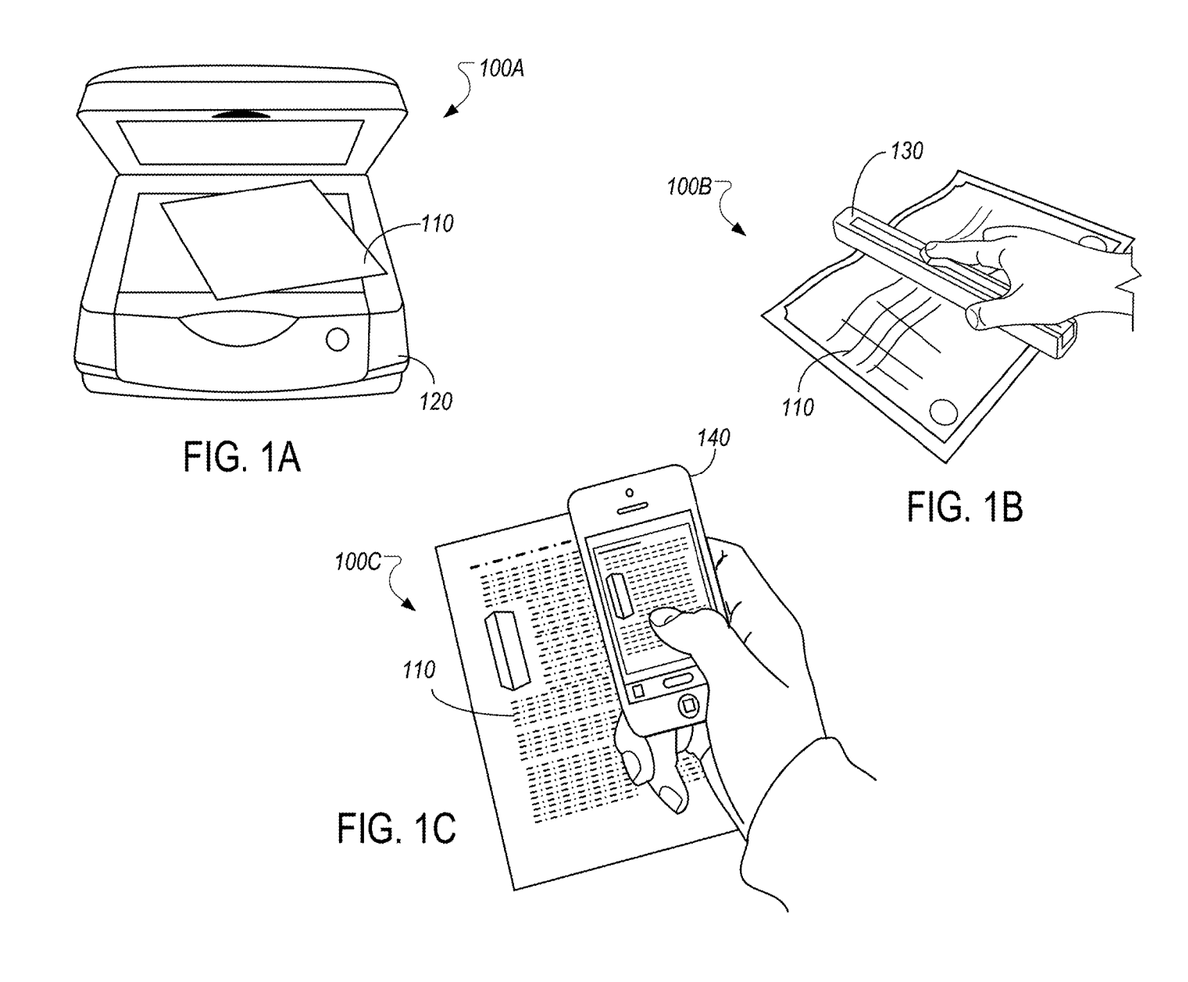
FIGS. 1A, 1B and 1C illustrate examples of obtaining an image of a document for classification.

FIGS. 1A, 1B and 1C illustrate examples of obtaining an image of a document 110 for classification. In some implementations, the document 110 may be any suitable document for which a determination is to be made whether the document is real or forged. For example, the document 110 may be a user identification document, such as a driver's license, a travel passport, a social security card, among others. Alternatively, the document 110 may be some other official document, such as an immigration document, an educational degree certificate, a certificate attesting to some professional skills, a bank check, a ration card, or a bond or stock certificate, among others. In some implementations, the document 110 may be a sample document that is known to be real or forged and that is used for training a classifier, as described in greater detail in the following sections.

FIG. 1A shows that, in some implementations, an electronic image of the document 110 may be obtained by scanning the document using a flatbed scanner 120. In some implementations, an electronic image of the document 110 may be obtained by scanning the document using a portable scanner, such as 130, as shown in FIG. 1B. In some implementations, an electronic image of the document 110 may be obtained by scanning the document using a mobile device that has a camera attached to it. For example, FIG. 1C shows that a mobile device 140 may capture an image of the document 110 by using a camera attached to the smartphone. The mobile device 140 may be a cellular phone such as a smartphone, a portable music player, a tablet computer, an electronic book reader, a camera with additional processing capabilities, or some other suitable computing device.

Once an image of the document 110 is obtained, e.g., using one of the options above, the image can be classified and, based on the classification, the document 110 can be determined to be real or forged. For example, a classification tool, which is also referred to interchangeably as a classifier, can be implemented in the portable device 130, or the mobile device 140. The classifier may process the obtained image and classify the image as either real or forged, as described in greater detail in the following sections. Once the image is classified, an output can be provided, e.g., as information shown on the display of the mobile device 140, indicating whether the image is determined to correspond to a real document or a forged document.

Additionally or alternatively, the image of the document 110 may be stored for later processing. For example, the image obtained by the flatbed scanner 120, or that obtained by the portable scanner 130 or the mobile device 140, may be stored in a computer memory (e.g. a hard drive or flash memory) that is coupled to a processing device, such as a computer. The flatbed scanner 120, the portable scanner 130 or the mobile device 140 may be communicatively coupled to the computer, and/or the computer memory. The computer may implement the techniques for automated image classification and forgery detection that are noted below. The computer may retrieve the image stored in the computer memory and classify the image as real or forged by executing routines that implement the classification and detection techniques. In some implementations, the computer may do so at a later time after the image is obtained.

Figure 2A:
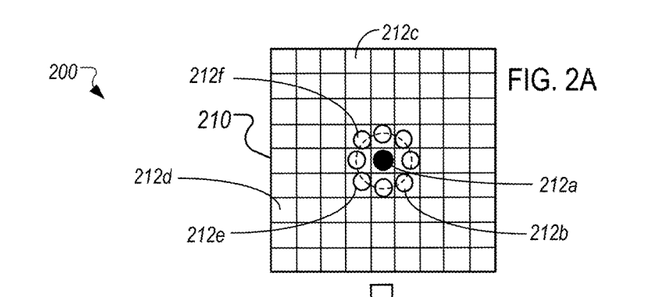
FIGS. 2A, 2B and 2C illustrate an example of a technique for automated classification of documents and detecting document characteristics.
Figure 2B:
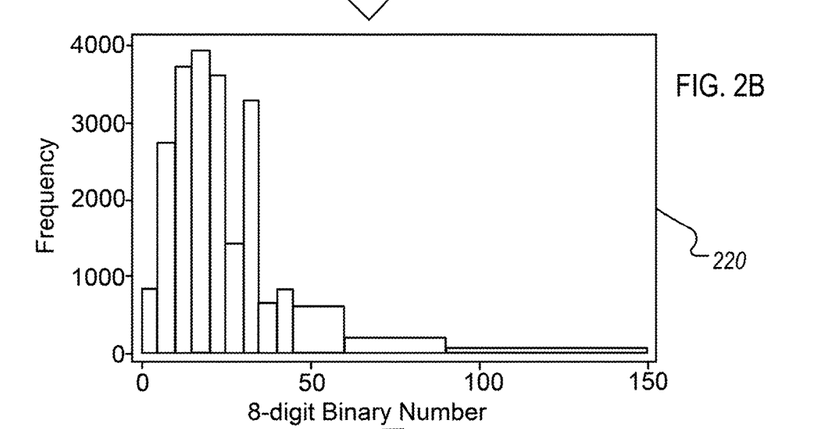
Figure 2C:
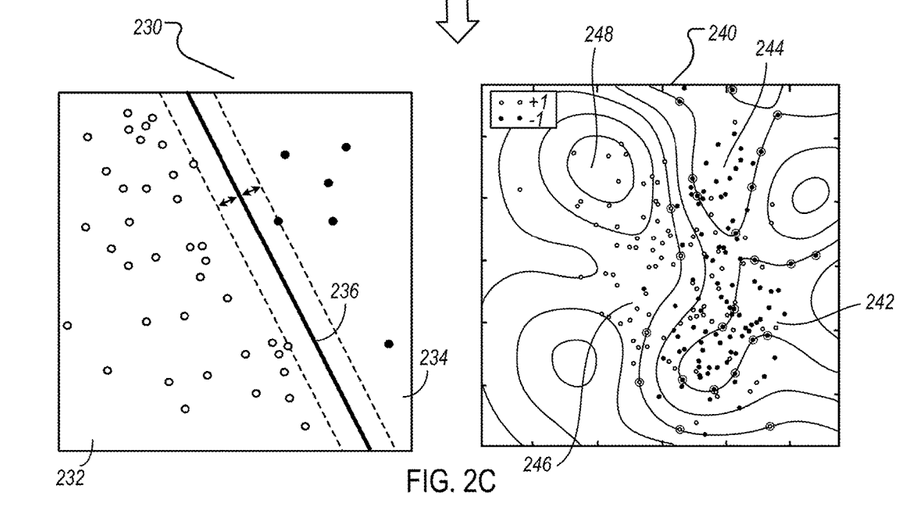

FIGS. 2A, 2B and 2C illustrate an example of a technique 200 for automated classification of documents and detecting document characteristics. In some implementations, the technique 200 can be applied to classify a document, e.g., 110 described above, as real or forged based on examining an image of the document, and accordingly detect forgeries. As noted above, the technique 200 can be implemented as instructions stored on a portable device, such as mobile device 140, or on a computer that is coupled to one or more of the devices 120, 130 or 140.

In this context, a document characteristic refers to a feature of a document that is of interest. For example, a characteristic may be whether a document is real. Additionally or alternatively, a characteristic may be whether a document is forged. Additionally or alternatively, a characteristic may be a particular functionality type associated with a document, e.g., whether a document is an identification document (such as a driver's license or passport), a financial document (such as a check), or a certification document (such as a degree certificate), among other suitable types.

In some implementations, characteristics may not be limited to documents; instead, characteristics may be associated more generally with images of other types of objects as well. For example, the objects may be paintings that may be classified based on electronic images of the paintings. In such cases, the characteristics of interest may be the particular style or era associated with the paintings, or identification of a painter based on a particular style of painting, among their suitable characteristics.

Describing the technique 200 in relation to classifying documents as real or forged, in some implementations, the technique 200 includes two main processes. In a training phase, sample images are used to train a classifier to differentiate between real and forged images. During this phase, images corresponding to sample documents that are known to be real or forged are generated and provided as inputs to the classifier as described in the following sections. After the classifier has been trained, the technique 200 is applied to documents of unknown characteristic (i.e., whether real or forged) and the trained classifier is used to make a determination.

During the training phase, the technique 200 initially generates an image pixel-level pattern for a document image. The pixel-level pattern can be a local binary pattern (LBP), or a local ternary pattern (LTP), or some other suitable pattern.

Describing an implementation that generates a LBP feature vector, an input image of a document is initially divided into one or more sections, referred to as cells. For example, FIG. 2A shows a cell 210, which can be a portion of a larger image, such as an image corresponding to the document 110 that is obtained as described previously. Each cell is composed of N×N pixels, where N is an integer. For example, as shown, the cell 210 may be composed of 9×9 pixels (i.e., N=9 in this example), such as 212*a*, 212*b*, 212*c* and 212*d*, among others.

Each pixel in a cell is compared to each of its neighboring pixels. For example, pixel 212*a* is compared to eight neighboring pixels that surround pixel 212*a*, such as pixels 212*b*, 212*e* and 212*f*, and five other pixels. In some implementations, the comparisons with the neighboring pixels are performed in a circular manner, either in a clockwise or counter-clockwise direction.

In comparing pixels, the values of the pixels are compared. In this context, a pixel in an image may have a single value or multiple values. A single value may represent the grayscale, brightness or intensity at the pixel location. A pixel with multiple values may have a color using a specific color system, for example, the Red-Green-Blue (RGB) system will have 3 values for the red, green and blue components respectively. A pixel may have more than 3 values to include measurements such as infrared or other spectrum. When pixels with multiple values are compared, the comparison is done for the corresponding components. In some implementations, for an image with multiple value components for its pixels, one or more of the components in each pixel may be included in the comparison.

In some implementations, in comparing a center pixel with its neighboring pixels, if the value of the center pixel is greater than the value of a neighboring pixel, then a binary 1 (one) is recorded for that comparison; otherwise a binary 0 (zero) is recorded. However, in other implementations, if the center pixel's value is greater than the value of the neighboring pixel, then a binary 0 is recorded; otherwise, a binary 1 is recorded. In either case, by comparing each pixel with its neighboring pixels, an 8-digit binary number is generated, with each digit in the number corresponding a neighboring pixel and representing the 1 or 0 value computed as described above by comparison of the neighboring pixel with the center pixel. In some implementations, the 8-digit binary number may be converted to decimal for convenience.

After 8-digit binary numbers are computed for all the pixels in a cell, a histogram is computed for the cell. For example, FIG. 2B shows a histogram 220 that is computed based on the 8-digit binary numbers of the pixels 212*a*, 212*b*, etc., of the cell 210. The histogram 220 shows the frequency of each 8-digit binary number occurring in the cell (i.e., each combination of which pixels are smaller and which are greater than the corresponding center pixel). In some implementations, the histogram 220 may be normalized.

After histograms are generated (and optionally, normalized) for all cells in the input image, the histograms of all the cells are concatenated. The concatenation of the histograms yields the LBP feature vector for the input image.

The feature vector for the input image as generated above is provided as an input to a classifier, along with information indicating whether the associated image corresponds to a real document or a forged document. For example, the LBP feature vector is provided to a classifier represented by the graph 230 or the graph 240 shown in FIG. 2C. The classifier 230 or 240 may be a neural network classifier, or a support vector machine (SVM) based-classifier, or some other suitable machine-learning based classifier.

In this context, a classifier refers to a supervised learning tool with associated learning algorithms that analyze data and recognize patterns, and may be used for classification and regression analysis. Given a set of training examples, each marked for belonging to one of two or more known categories, the classifier builds a model that assigns new examples into one of several modeled classes or categories. As described in greater detail below, the classifier may be implemented as a set of instructions that are executed by one or more processors.

Continuing with the above example, during the training phase, the document being processed is known to be either real or forged. The classifier is accordingly trained to associate the input feature vector with either a class representing real documents or a class representing forged documents. During the training phase, the classifier is provided feature vectors for multiple sample images, each marked as belonging to one of two classes (i.e., real or forged), and trained to associate the feature vectors with either a first class (e.g., corresponding to real documents), or a second class (e.g., corresponding to forged documents). For example, considering the classifier 230, feature vectors that map to the space 232 may be classified as belonging to the first class, while feature vectors that map to the space 234 may be classified as belonging to the second class. In some implementations, feature vectors in the first class may be below a threshold 236, while feature vectors in the second class may be above the threshold 236. However, in other implementations, feature vectors in the first class may be above the threshold 236, while feature vectors in the second class may be below the threshold 236. In some implementations, the classifier builds a model that records feature vectors as belonging to either the first class or the second class.

During actual use, a LBP feature vector is generated for an image corresponding to a document that is to be authenticated, in a manner similar to that described with respect to FIGS. 2A and 2B. The image of the document may be obtained as described in FIG. 1A, 1B or 1C, or by other suitable means.

The feature vector is provided as an input to the trained classifier, e.g., 230 or 240. The classifier calculates a numerical score to show how likely the document is to be a real document or a forged document. For example, in some implementations, the classifier compares the numerical score calculated from the input feature vector to the threshold 236 and determines whether the score of the input feature vector is below (i.e., corresponding to the first class) or above (i.e., corresponding to the second class) the threshold 236. In some implementations, the classifier compares the input feature vector to feature vectors known to the classifier (e.g., the feature vectors that are in its model) and determines whether the input feature vector is more closely related to feature vectors in the first class or feature vectors in the second class. Based on this determination, the classifier computes the likelihood or probability that the input feature vector belongs to one of the first class or the second class.

Accordingly, the classifier estimates the input feature vector as having a characteristic associated with its determined class (i.e., real or forged) with a certain probability. The probability indicates the classifier's confidence in its determination. For example, if the input feature vector is estimated to correspond to the class representing real documents, the document that is being authenticated is determined to be a real document. However, if the input feature vector is estimated to correspond to the class representing forged documents, the document that is being authenticated is determined to be a forged document. In some implementations, the classifier outputs the numerical score indicating the probability that the input feature vector corresponds to a real document or a forged document.

In the manner described above, LBP may be used to generate feature vectors for classifying documents and to improve the detection of forged documents. In some implementations, LTP, or some other suitable algorithm, is used. Unlike LBP, LTP does not threshold pixels into 0 and 1; but it uses a threshold constant to threshold pixels into three values. For example, considering k as the threshold constant, c as the value of the center pixel and p as the value of a neighboring pixel, the result of threshold is: 1 if p is greater than c+k; 0 if p>c−k and p<c+k; and −1 if p<c−k. In this manner, each thresholded pixel has one of the three values. Neighboring pixels are combined after thresholding into a ternary pattern. Computing a histogram of these ternary values may result in a large range, and accordingly the ternary pattern may be split into two binary patterns. Histograms may be concatenated to generate a descriptor, which may be double the size of LBP.

The above example describes implementation in which documents are classified as either real or forged. In some implementations, the technique 200 may be used to classify documents based on other characteristics. For example, the technique 200 may be used determine whether an input document is a bank check, or some other particular form of document. Other suitable characteristics also may be used.

In the above example, the classifier assigns an input feature vector to one of two classes. For example, the classifier 230 determines whether an input feature vector maps to the space 232 corresponding to the first class, or to the space 234 corresponding to the second class. However, in some implementations, there may be more than two classes in the model, and the classifier may assign an input feature vector into one of these multiple classes. In such cases, the classifier may be a multiclass classifier, such as a multiclass SVM that is configured to assign labels to instances by using support vector machines, where the labels are drawn from a finite set of several elements. For example, the classifier 240 may model four different classes represented by 242, 244, 246 and 248. Accordingly, the classifier 240 may assign an input feature vector to one of these four different classes and output a numerical score indicating how likely the associated document includes a characteristic associated with one of these classes.

The multiple classes may correspond to multiple different characteristics that are to be detected. For example, the multiple classes may be used to detect a type of an input document, such as whether the document is a bank check, a driver's license, a passport, a bond certificate, or some other suitable type. The multiple classes may be used to characterize images for other purposes as well, e.g., to assign paintings to one of several different styles.

Figure 3:
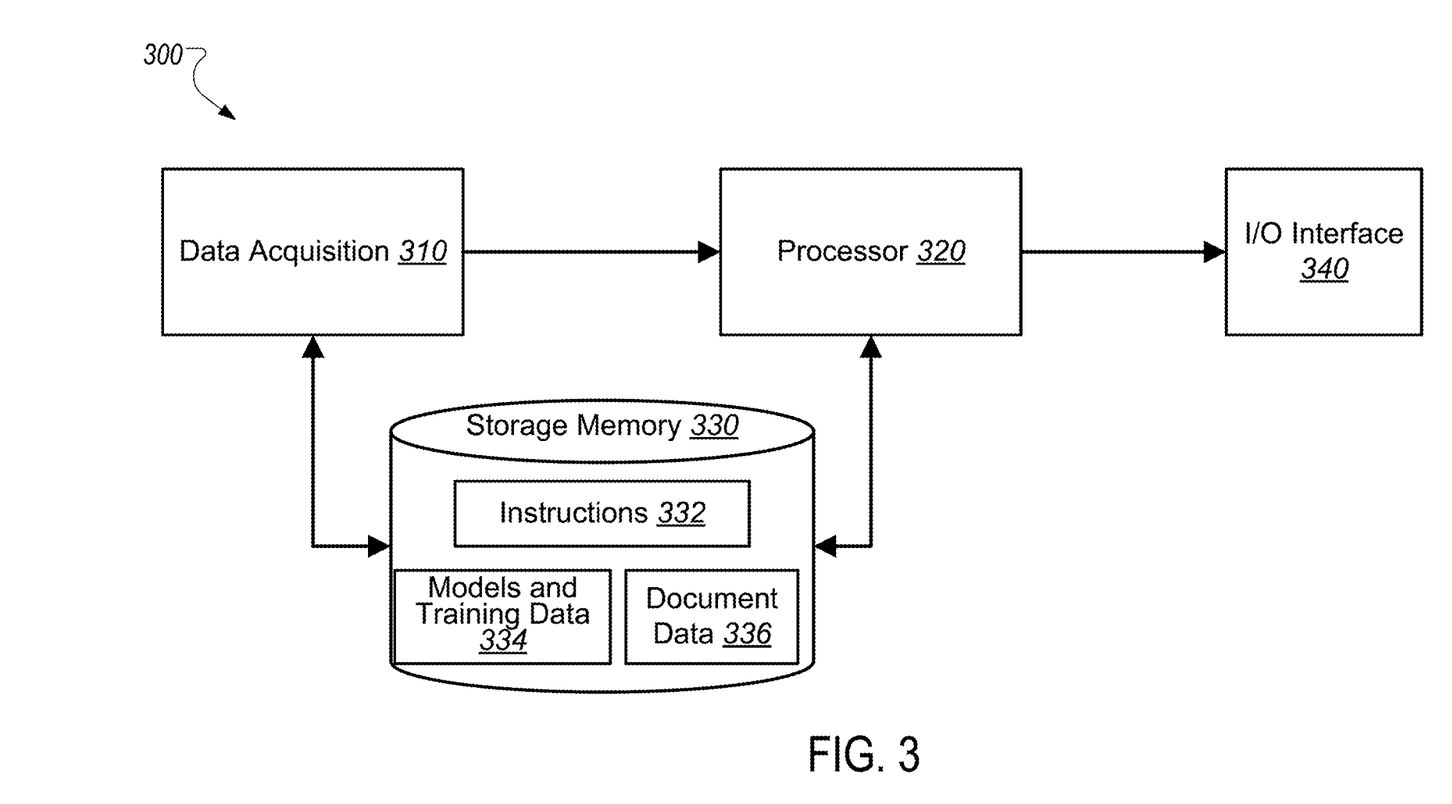
FIG. 3 illustrates a block diagram of an example system for classifying documents and detecting document characteristics.

FIG. 3 illustrates a block diagram of an example system 300 for classifying documents and detecting document characteristics. In some implementations, the system 300 may apply the technique 200 to classify a document, e.g., 110, as real or forged based on examining an image of the document, and accordingly detect forgeries.

In the example shown in FIG. 3, the system 300 includes a data acquisition module 310, a processor 320, storage memory 330 and an input/output interface (I/O interface) 340. The storage memory 330 includes instructions 332, raw data 334, which includes models and training data, and extracted image data 336.

In some implementations, the system 300 may be a single hardware device that incorporates all the modules shown in FIG. 3. For example, the system 300 may be a computer with a camera or other optical input, a processor, a storage device and input/output such as a keyboard, a mouse and a display. Alternatively, the system 300 may be a portable device (e.g., a smartphone) with a camera, a processor, on board memory, a touchscreen display that also provides input functionality, and/or additional input hardware (such as hardware buttons). In some implementations, the system 300 may be implemented by the portable scanner 130 or the mobile device 140, as described above. However, in other implementations the system 300 may include separate hardware devices that are coupled to one another. For example, the system 300 may include a scanner device, such as the flatbed scanner 120, coupled to a computer with a processor, storage memory and a display. In some implementations, the system 300 may be implemented with modules remotely linked through a network. For example, a scanner device may be in a different physical location from a computer that does the processing 320. The scanner may acquire an image and send the image to the remote computer via network connections for classification and detection. Other suitable configurations of the system 300 are also possible.

The data acquisition module 310 is configured to obtain images corresponding to documents under examination as an input to the system. For example, the data acquisition module 310 may obtain an image of the document 110 as described previously. In some implementations, the data acquisition module 310 may include an optical component to obtain the image, such as a camera to capture images, or a scanner to scan in physical documents, or some other suitable hardware.

In some implementations, the data acquisition module 310 is configured to receive various inputs from a user, such as from an operator associated with the system 300. The inputs from the user may include images that are to be analyzed for classification and detection.

In some implementations, the images acquired by the data acquisition module 310 are provided to the processor 320 for generating feature vectors corresponding to the images and using the feature vectors to classify the images (and correspondingly, the associated documents) into various classes as described above. Additionally or alternatively, the images acquired by the data acquisition module 310 may be stored in the storage memory 330, e.g., as training data 334 (in case of sample images) or as document data 336 (in case of images to be examined). The stored images may be processed at a later time by the processor 320.

Although one processor 320 is shown, the system 300 may include more than one processor. The processor 320 is configured to execute instructions 332 stored in the storage memory 330. In some implementations, the instructions 332 encode the technique 200 for classifying documents as real or forged and accordingly detect forgeries. For example, the instructions 332 may implement processing routines for generating image pixel-level patterns of cells of the input image, e.g., 210; computing histograms, e.g., 220, based on the pixel-level patterns; and generating feature vectors for the images by concatenating the histograms. These instructions may include instructions for generating LBP or LTP-based feature vectors.

Additionally or alternatively, the instructions 332 may encode algorithms for training classifiers, such as 230 or 240, using feature vectors corresponding to sample documents. The training data for the classifiers, and the models that are generated based on the training, may be stored as models and training data 334.

Additionally or alternatively, the instructions 332 may encode algorithms to use trained classifiers, such as 230 or 240, to assign examined images to one of several known classes, such as real or forged, and provide information (e.g., numerical scores) indicating probability of accuracy of the classification. The assignation of examined images to particular classes and determination of probabilities or other information related to the assignation may be stored as document data 336. These instructions may include instructions for using neural network based classifiers or SVM-based classifiers. In some implementations, the instructions 332 may implement additional or alternative routines as well, e.g., algorithms corresponding to other pattern generation tools or other classifiers.

The storage memory 330 stores the various instructions 332, the models and training data 334 noted above and the document data 336. In some implementations, the storage memory 330 may include read-only memory (ROM) and/or random access memory (RAM). Additionally or alternatively, the storage memory 330 may include flash memory. In some implementations, the storage memory 330 may include magnetic or optical memory, such as hard disk drives, computer disc or digital video disc memory (CD-ROM or DVD-ROM), among others.

The I/O interface 340 is configured to receive various inputs from a user, such as from an operator associated with the system 300. The inputs from the user may include commands to obtain images of documents to be examined, commands to train the classifiers or use the trained classifiers for classifying input images and detecting forgeries, or some other suitable inputs. The I/O interface 340 may include one or more of a display, a keyboard or other dedicated input hardware, a microphone and speakers. Inputs may be received through the display (e.g., touch input via a touchscreen interface shown on a touch-sensitive display), using the keyboard/dedicated input hardware, or the microphone (e.g., voice commands). Output may be provided through the display (e.g., text or graphics shown on a user interface) or through the speakers (e.g., audio output). The output may include scanned or captured images; or results of the processor 320 classifying an input image and determining the characteristic associated with the image, such as determining whether the input image corresponds to a real document or a forged document, or a particular type of several available types of documents associated with the input image.

In some implementations, the I/O interface 340 may not be included in the system 300. In some implementations, one or more components of the I/O interface 340 may not be present. For example, the I/O interface 340 may include only a display for visual input/output.

Figure 4:
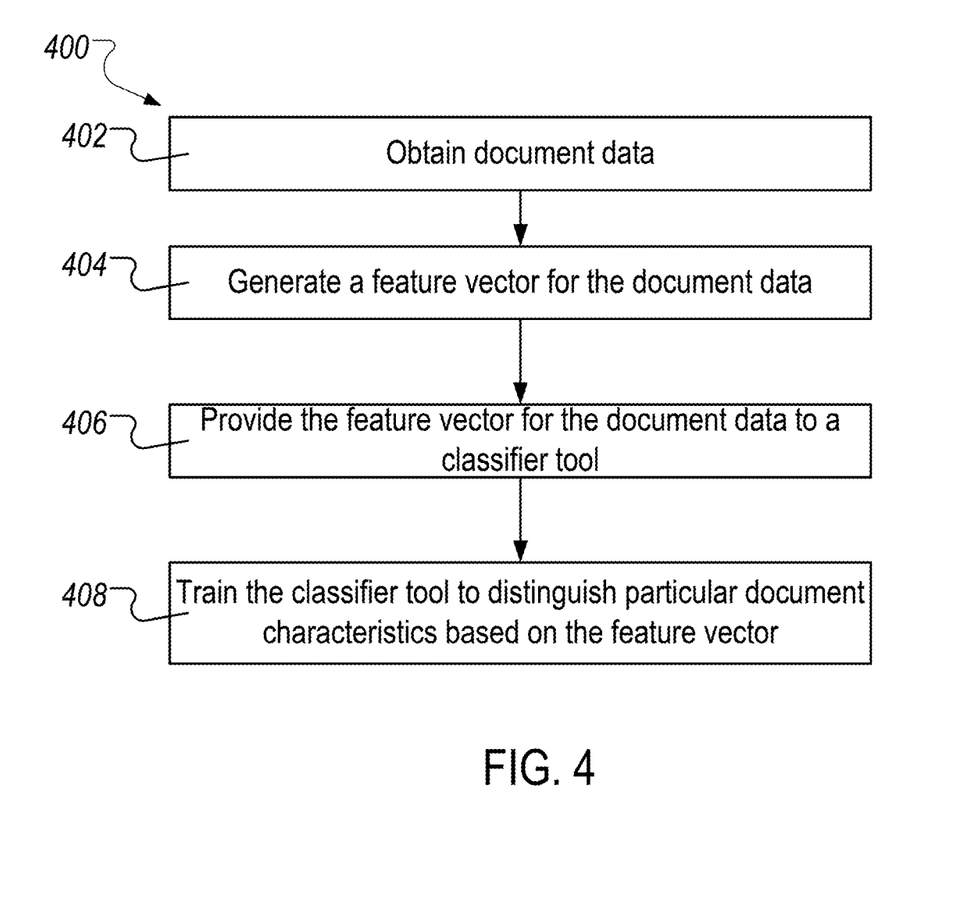
FIG. 4 illustrates an example process for training a classifier to detect document characteristics.

FIG. 4 illustrates an example process 400 for training a classifier to detect document characteristics. In some implementations, the process 400 may be performed by the system 300 and may correspond to the technique 200. Accordingly, the following section describes the process 400 with respect to the system 300 and the technique 200. However, the process 400 also may be performed by other devices or system configurations.

In some implementations, the process 400 is performed by one or more processors (e.g., processor 320) included in the system 300 that execute instructions, e.g., instructions 332, for training classifiers, such as 230 or 240, to classify documents into one of several classes that correspond to particular document characteristics, such as whether a document is real or forged. As described previously, these instructions may be stored in storage memory (e.g., storage memory 330) that is included in the system 300.

The process 400 starts by obtaining document data (402). For example, the data acquisition module 310 may obtain an image of a document, such as 110. The obtained image may be forwarded directly to the processor 320 for processing as part of training the classifier tool, and/or the image may be stored in the storage memory 330, e.g., as training data 334, for later processing.

A feature vector is generated for the document data (404). For example, the processor 320 executes the instructions for computing a feature vector of the input image corresponding to the document based on generating image pixel-level patterns and associated histograms.

The feature vector for the document data is provided to a classifier tool (406). For example, the processor 320 trains a classifier, such as 230 or 240, by providing the feature vector of the image to the classifier along with information indicating a particular characteristic of the classifier that is being modeled. For example, the processor 320 may provide the feature vector to the classifier along with information indicating whether the associated document is real or forged.

The classifier tool is trained to distinguish particular document characteristics based on the feature vector (408). For example, the particular document characteristic may correspond to whether a document is real or forged and the classifier is trained to classify the input feature vector as corresponding to either a real document or a forged document.

In this manner, in the process 400 the classifier is provided with feature vectors for multiple sample images, each marked as associated with a particular characteristic, and trained to classify the feature vectors in one of several classes corresponding to a particular characteristic. In some implementations, the classifier builds up a model that records feature vectors as associated with one of the characteristics being examined.

Figure 5:
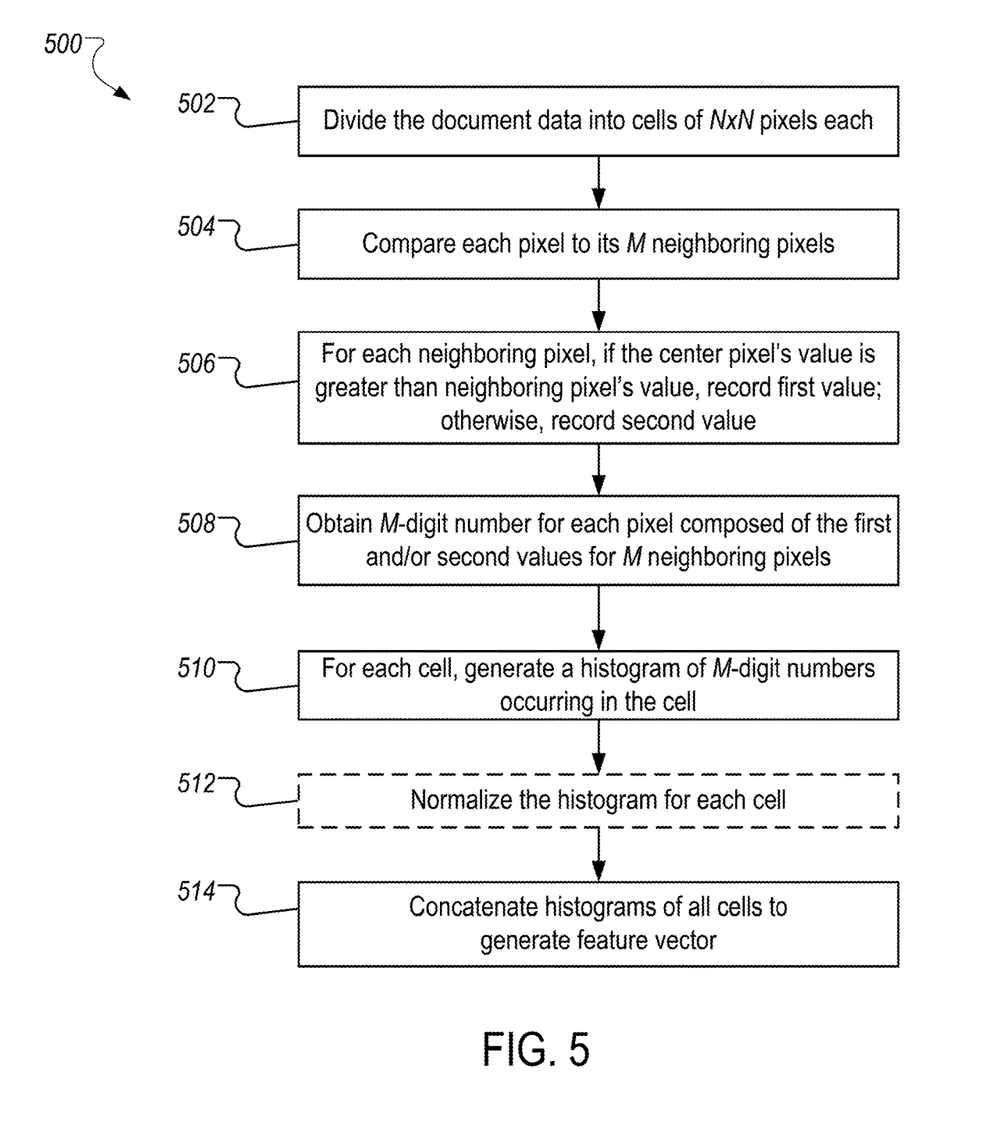
FIG. 5 illustrates an example process for generating a feature vector for an image of a document.

FIG. 5 illustrates an example process 500 for generating a feature vector for an image of a document. In some implementations, the process 500 may be performed by the system 300 and correspond to the technique 200. Accordingly, the following section describes the process 500 with respect to the system 300 and the technique 200. However, the process 500 also may be performed by other devices or system configurations.

In some implementations, the process 400 is performed by one or more processors (e.g., processor 320) included in the system 300 that execute instructions, e.g., instructions 332, for generating pixel-level patterns for image cells, computing histograms of the patterns and generating feature vectors based on the computed histograms. As described previously, these instructions may be stored in storage memory (e.g., storage memory 330) that is included in the system 300.

In some implementations, the process 500 is performed in conjunction with the process 400. For example, the process 500 may be performed for generating the feature vector for the document data (404).

The process 500 divides the document data into cells of N×N pixels each (502). For example, the processor 320 obtains an image of a document as described at 402, and divides the image into one or more cells, such as cell 210. Each cell is composed of N×N pixels, where N is an integer. For example, the cell 210 may be composed of 9×9 pixels (i.e., N=9 in this example), such as 212*a*, 212*b*, 212*c* and 212*d*, among others.

Each pixel is compared to its M neighboring pixels (504). For example, the processor 320 compares each pixel in a cell to each of its neighboring pixels. For example, considering cell 210, pixel 212*a* is compared to its eight neighboring pixels (i.e., M=8 in this example) that surround pixel 212*a*, such as pixels 212*b*, 212*e* and 212*f*.

For each neighboring pixel, if the center pixel's value is greater than neighboring pixel's value, a first value is recorded; otherwise, a second value is recorded (506). For example, upon comparing each pixel (i.e., the center pixel), e.g., pixel 212*a*, with each neighboring pixel, e.g., pixel 212*b*, 212*e* or 212*f*, the processor 320 determines whether the center pixel's value is greater than the value of the neighboring pixel. Then the processor 320 records a first value associated with that particular <center pixel, neighboring pixel> combination. Otherwise, if the center pixel's value is less than the value of the neighboring pixel, then the processor records a second value associated with that particular <center pixel, neighboring pixel> combination. As noted previously, in some implementations the first value is 1 and the second value is 0, while in other implementations the values are reversed.

As noted previously, in some implementations, generation of the pixel-level pattern and computation of the binary values by comparing neighboring pixels may be based on using an LBP algorithm. However, in some implementations, LTP may be used, or some other suitable algorithm.

An M-digit number is obtained for each pixel composed of the first and/or second values for the M neighboring pixels (508). For example, the processor 320 obtains first or second values by comparing each center pixel in the cell 210 (e.g., 212*a*) with its 8 neighboring pixels (e.g., 212*b*, 212*e* or 212*f*). Each value for a <center pixel, neighboring pixel> combination represents a bit in an 8-digit binary number (here M=8). Accordingly, the 8-digit binary number is generated, with each digit in the number representing the 1 or 0 value computed by comparison of the neighboring pixel with the center pixel. In some implementations, the 8-digit binary number may be converted to decimal for convenience.

For each cell, a histogram of M-digit numbers occurring in the cell is generated (510). For example, after 8-digit binary numbers are computed for all the pixels in a cell, the processor 320 computes a histogram for the cell. For example, the processor 320 may compute a histogram 220 that is based on 8-digit binary numbers of the pixels 212*a*, 212*b*, etc. of the cell 210. As noted previously, the histogram 220 shows the frequency of each 8-digit binary number occurring in the cell.

In some implementations, the histogram for each cell is normalized (512). For example, in some implementations, the processor 320 normalizes the histogram that is computed for each cell of an image, such as the histogram 220 associated with the cell 210. However, in other implementations, the histograms may not be normalized such that the process 500 may not implement 512.

Histograms of all cells are concatenated to generate the feature vector (514). For example, after the processor 320 generates (and optionally, normalizes) the histograms for all cells in the input image as described above, the processor 320 concatenates the histograms of all the cells to generate the feature vector for the input image. In some implementations, the generated feature vector may be used for training the classifier, as described at 406 and 408 in the process 400. This may be the case, for example, when a sample document is used with the characteristic of interest of the document (e.g., whether real or forged) being known. In some implementations, the generated feature vector may be provided as input to a trained classifier during actual use, when the characteristic of interest of the document is to be determined, as noted below.

Figure 6:
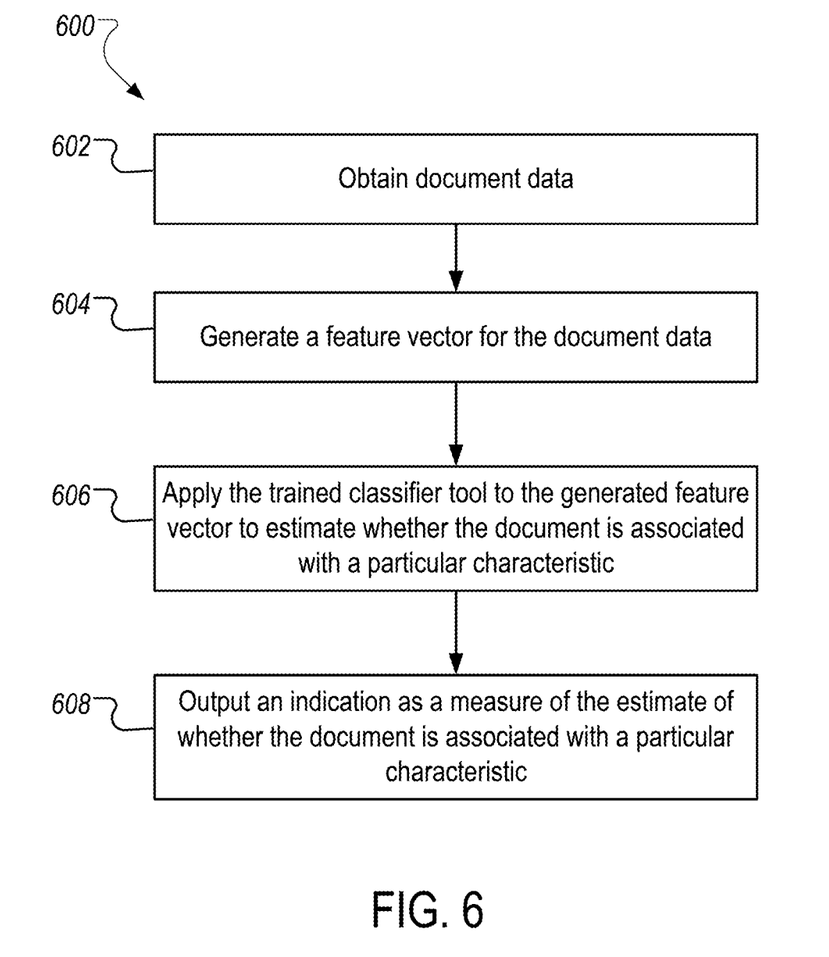
FIG. 6 illustrates an example process for detecting a characteristic of a document using a classifier that is trained to detect document characteristics.

FIG. 6 illustrates an example process 600 for detecting a characteristic of a document using a classifier that is trained to detect document characteristics. The characteristic may be, for example, whether the document is forged. In some implementations, the process 600 may be performed by the system 300 and correspond to the technique 200. Accordingly, the following section describes the process 600 with respect to the system 300 and the technique 200. However, the process 600 also may be performed by other devices or system configurations.

In some implementations, the process 600 is performed by one or more processors (e.g., processor 320) included in the system 300 that execute instructions, e.g., instructions 332, for using trained classifiers, such as 230 or 240, to estimate whether a document being examined includes a particular characteristic, such as whether the document is real or forged, and provide a numerical score associated with the estimate. As described previously, these instructions may be stored in storage memory (e.g., storage memory 330) that is included in the system 300.

The process 600 starts by obtaining document data (602). For example, the data acquisition module 310 may obtain an image of a document that is to be examined, such as document 110. The obtained image may be forwarded directly to the processor 320 for processing and detection, and/or the image may be stored in the storage memory 330, e.g., as document data 336, for later processing.

A feature vector is generated for the document data (604). For example, the processor 320 executes the instructions for computing a feature vector of the input image corresponding to the document based on generating image pixel-level patterns and associated histograms. In some implementations, the processor 320 may use the process 500 for generating the feature vector for the document data.

The trained classifier tool is applied to the generated feature vector to estimate whether the document is associated with a particular characteristic (606). For example, the processor 320 provides the generated feature vector as an input to a trained classifier, such as 230 or 240. The classifier compares the input feature vector to the models generated based on the training data as described previously, and determines the likelihood that the feature vector maps to one of the modeled classes, and accordingly the corresponding document includes the characteristic associated with the mapped class. For example, the classifier may determine the likelihood that the feature vector of the input image maps to a class of feature vectors associated with real documents, or a class of feature vectors associated with forged documents, and accordingly, whether the document associated with the input feature vector is real or forged.

An indication is output as a measure of the estimate of whether the document is associated with a particular characteristic (608). For example, the processor 320 uses to classifier to calculate a numerical score that indicates the probability with which classifier determines the feature vector to map to one of the modeled classes. Continuing with the above example of classes representing real and forged documents, the classifier may estimate, with a certain probability, the input feature vector maps to the class of feature vectors associated with forged documents. Accordingly, the classifier may provide a numerical score indicating the probability with which the input feature vector maps to class of forged documents, which indicates the probability that the document being examined is forged. Alternatively, if the classifier estimates that the input feature vector maps to the class of feature vectors associated with real documents, the classifier may provide a numerical score indicating the probability with which the input feature vector maps to class of real documents, which indicates the probability that the document being examined is real. As described previously, the numerical score, or some other suitable information that indicates the determination made by the classifier and the associated probability, may be provided to a user through the I/O interface 340.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   obtaining, by a data acquisition module of a hardware computing system, first data corresponding to a first document, the first data comprising pixel-level patterns for a document image that represents the first document, the pixel-level patterns comprising a cell having multiple image pixels;
   computing, at the hardware computing system, mathematical relationships between each of the multiple image pixels using a threshold constant to threshold each image pixel into multiple values to generate a range of values;
   generating, using a processing device of the hardware computing system, a first feature vector for the first data based on binary data that represents the range of values generated from the computed mathematical relationships between each of the multiple image pixels;
   providing, using the processing device, the first feature vector as an input to a classifier of the hardware computing system, the input being used for training the classifier; and
   training the classifier to characterize the first document as having one of a first characteristic or a second characteristic based on the first feature vector.

2. The method of claim 1, wherein the first characteristic corresponds to identifying a document as real, and the second characteristic corresponds to identifying a document as fake.

3. The method of claim 1, further comprising:
   iteratively providing, as inputs to the classifier, feature vectors associated with a plurality of documents for training the classifier, wherein each document in the plurality has one of the first characteristic or the second characteristic.

4. The method of claim 1, further comprising:
   obtaining second data corresponding to a second document;
   generating a second feature vector for the second data;
   providing the second feature vector as an input to the classifier;
   estimating, by the classifier and based on the second feature vector, whether the second document corresponds to the first characteristic or the second characteristic; and
   outputting, by the classifier, a measure of the estimate whether the second document corresponds to the first characteristic or the second characteristic.

5. The method of claim 4, wherein estimating whether the second document corresponds to the first characteristic or the second characteristic comprises:
   categorizing, by the classifier and based on the training, a plurality of feature vectors into one of a first group corresponding to the first characteristic or a second group corresponding to the second characteristic;
   determining, by the classifier, whether the second feature vector corresponds to feature vectors included in the first group or the second group;
   estimating, by the classifier, that the second document corresponds to the first characteristic conditioned on determining that the second feature vector corresponds to feature vectors included in the first group; and
   estimating, by the classifier, that the second document corresponds to the second characteristic conditioned on determining that the second feature vector corresponds to feature vectors included in the second group.

6. The method of claim 4, wherein obtaining the first data includes obtaining an image of the first document and obtaining the second data includes obtaining an image of the second document.

7. The method of claim 6, wherein generating the first feature vector comprises generating a pixel-level pattern of the image the first document, the method further comprising:
   dividing the first data into cells, each cell including multiple image pixels;
   for each pixel in the multiple image pixels in a cell:
      comparing the pixel to a group of neighboring pixels,
      for each neighboring pixel in the group, recording a first value based on determining that a value of the pixel is greater than a value of the neighboring pixel, and recording a second value based on determining that the value of the pixel is smaller than the value of the neighboring pixel, and
      computing a number for the pixel that is composed of one or more of first values and second values determined for the group of neighboring pixels;
   for each cell, generating a histogram of the numbers for the pixels included in the cell;
   aggregating the histograms for all the cells corresponding to the first data; and
   generating the first feature vector for the first data based on the aggregated histograms.

8. The method of claim 7, wherein the number computed for a pixel from the first value and the second value corresponds to a binary value.

9. The method of claim 7, wherein the number for each pixel includes a binary number with a number of digits that corresponds to a computed number from the neighboring pixels in the group of neighboring pixels.

10. The method of claim 7, wherein generating the histogram for each cell further comprises normalizing the histogram.

11. The method of claim 6, wherein generating the first feature vector or the second feature vector comprises generating one or more of local ternary patterns, image texture patterns, or image pattern combinations and variations, wherein the first feature vector or the second feature vector is generated based on the one or more local ternary patterns by computing the mathematical relationships between image pixels in a cell using the threshold constant to threshold each image pixel into multiple values.

12. The method of claim 1, wherein the classifier includes one of a neural network classifier or a support vector machine (SVM) classifier.

13. The method of claim 1, wherein the first feature vector includes a collection of numbers derived from the document or the binary data that represents the range of values generated from the computed mathematical relationships between each of the multiple image pixels.

14. The method of claim 1, wherein the document includes a physical object with information printed, written, etched or pressed by one or more fabricating means.

15. The method of claim 1, wherein the document is a digital document with information and layout rendered on a display device, and
wherein the display device is one of a display monitor, a television, a phone, or a device configured to render and display digital information.

16. A non-transitory storage medium storing instructions that, when executed by one or more processors, cause the one or more processors to perform operations comprising:
obtaining, by a data acquisition module of a hardware computing system, first data corresponding to a first document, the first data comprising pixel-level patterns for a document image that represents the first document, the pixel-level patterns comprising a cell having multiple image pixels;
computing, at the hardware computing system, mathematical relationships between each of the multiple image pixels using a threshold constant to threshold each image pixel into multiple values to generate a range of values;
generating, using a processing device of the hardware computing system, a first feature vector for the first data based on binary data that represents the range of values generated from the computed mathematical relationships between each of the multiple image pixels;
providing, using the processing device, the first feature vector as an input to a classifier of the hardware computing system, the input being used for training the classifier; and
training the classifier to characterize the first document as having one of a first characteristic or a second characteristic based on the first feature vector.

17. The non-transitory storage medium of claim 16, wherein the first characteristic corresponds to identifying a document as real, and the second characteristic corresponds to identifying a document as fake.

18. The non-transitory storage medium of claim 16, wherein the operations further comprise:
iteratively providing, as inputs to the classifier, feature vectors associated with a plurality of documents for training the classifier, wherein each document in the plurality has one of the first characteristic or the second characteristic.

19. The non-transitory storage medium of claim 16, wherein the operations further comprise:
obtaining second data corresponding to a second document;
generating a second feature vector for the second data;
providing the second feature vector as an input to the classifier;
estimating, by the classifier and based on the second feature vector, whether the second document corresponds to the first characteristic or the second characteristic; and
outputting, by the classifier, a measure of the estimate whether the second document corresponds to the first characteristic or the second characteristic.

20. The non-transitory storage medium of claim 19, wherein estimating whether the second document corresponds to the first characteristic or the second characteristic comprises:
categorizing, by the classifier and based on the training, a plurality of feature vectors into one of a first group corresponding to the first characteristic or a second group corresponding to the second characteristic;
determining, by the classifier, whether the second feature vector corresponds to feature vectors included in the first group or the second group;
estimating, by the classifier, that the second document corresponds to the first characteristic conditioned on determining that the second feature vector corresponds to feature vectors included in the first group; and
estimating, by the classifier, that the second document corresponds to the second characteristic conditioned on determining that the second feature vector corresponds to feature vectors included in the second group.

21. A system comprising:
one or more processors; and
a non-transitory storage device storing instructions that, when executed by the one or more processors, cause the one or more processors to perform operations comprising:
obtaining, by a data acquisition module of a hardware computing system, first data corresponding to a first document, the first data comprising pixel-level patterns for a document image that represents the first document, the pixel-level patterns comprising a cell having multiple image pixels;
computing, at the hardware computing system, mathematical relationships between each of the multiple image pixels using a threshold constant to threshold each image pixel into multiple values to generate a range of values;
generating, using a processing device of the hardware computing system, a first feature vector for the first data based on binary data that represents the range of values generated from the computed mathematical relationships between each of the multiple image pixels;
providing, using the processing device, the first feature vector as an input to a classifier of the hardware computing system, the input being used for training the classifier; and
training the classifier to characterize the first document as having one of a first characteristic or a second characteristic based on the first feature vector.

22. The system of claim 21, wherein the first characteristic corresponds to identifying a document as real, and the second characteristic corresponds to identifying a document as fake.

23. The system of claim 21, wherein the operations further comprise:
iteratively providing, as inputs to the classifier, feature vectors associated with a plurality of documents for training the classifier, wherein each document in the plurality has one of the first characteristic or the second characteristic.

24. The system of claim 21, wherein the operations further comprise:
obtaining second data corresponding to a second document;
generating a second feature vector for the second data;
providing the second feature vector as an input to the classifier;
estimating, by the classifier and based on the second feature vector, whether the second document corresponds to the first characteristic or the second characteristic; and outputting, by the classifier, a measure of the estimate whether the second document corresponds to the first characteristic or the second characteristic.

25. The system of claim 24, wherein estimating whether the second document corresponds to the first characteristic or the second characteristic comprises:

categorizing, by the classifier and based on the training, a plurality of feature vectors into one of a first group corresponding to the first characteristic or a second group corresponding to the second characteristic;

determining, by the classifier, whether the second feature vector corresponds to feature vectors included in the first group or the second group;

estimating, by the classifier, that the second document corresponds to the first characteristic conditioned on determining that the second feature vector corresponds to feature vectors included in the first group; and estimating, by the classifier, that the second document corresponds to the second characteristic conditioned on determining that the second feature vector corresponds to feature vectors included in the second group.

* * * * *